United States Patent
Meyrahn et al.

(10) Patent No.: US 10,059,562 B2
(45) Date of Patent: Aug. 28, 2018

(54) CLIP REEL

(71) Applicant: Poly-clip System GmbH & Co. KG, Hattersheim (DE)

(72) Inventors: Joachim Meyrahn, Erzhausen (DE); Klaus Hein, Gedern (DE)

(73) Assignee: Poly-clip System GmbH & Co. KG, Hattersheim (DE)

( * ) Notice: Subject to any disclaimer, the term of this patent is extended or adjusted under 35 U.S.C. 154(b) by 225 days.

(21) Appl. No.: 14/976,709

(22) Filed: Dec. 21, 2015

(65) Prior Publication Data
US 2016/0176674 A1   Jun. 23, 2016

(30) Foreign Application Priority Data
Dec. 22, 2014   (DE) .................. 20 2014 010 142 U

(51) Int. Cl.
*B65H 75/14*   (2006.01)
*A22C 11/12*   (2006.01)
(Continued)

(52) U.S. Cl.
CPC ............ *B65H 75/14* (2013.01); *A22C 11/125* (2013.01); *B65H 75/182* (2013.01); *B65H 75/22* (2013.01);
(Continued)

(58) Field of Classification Search
CPC ...... A22C 11/125; B65H 75/14; B65H 75/30; B65H 75/22; B65H 75/182; B65H 2701/53; B65H 2701/3914
See application file for complete search history.

(56) References Cited

U.S. PATENT DOCUMENTS 3,642,223 A * 2/1972 Feichtinger ............ B65H 75/14
242/118.4
4,406,422 A   9/1983 Philips
(Continued)

FOREIGN PATENT DOCUMENTS

CN   2228071 Y   5/1996
CN   101376476 A   3/2009
(Continued)

OTHER PUBLICATIONS

German search report issued in corresponding German Application No. 202014010142.6 dated Sep. 30, 2015 (5 pages).
(Continued)

*Primary Examiner* — William A. Rivera
(74) *Attorney, Agent, or Firm* — Fitch, Even, Tabin & Flannery LLP

(57) ABSTRACT

The present invention relates to a reel for storing and dispensing a winding material wound on the reel. The reel comprises a hub and side walls each disposed at the axial end faces of the hub and protruding past the outer circumferential surface of the hub in an approximately radial direction, the storage space defined by the surfaces of the side walls facing toward each other and the outer circumferential surface of the hub and surrounding the hub serving for receiving the winding material. The hub is at least double-walled in design, having a first hub wall and having a second hub wall spaced radially apart from the first hub wall. Moreover, the reel is formed of two reel halves identical in design.

15 Claims, 4 Drawing Sheets

(51) Int. Cl.
*B65H 75/18* (2006.01)
*B65H 75/22* (2006.01)
*B65H 75/30* (2006.01)

(52) U.S. Cl.
CPC ..... *B65H 75/30* (2013.01); *B65H 2701/3914* (2013.01); *B65H 2701/53* (2013.01)

(56) References Cited

U.S. PATENT DOCUMENTS

| | | | | |
|---|---|---|---|---|
| 4,726,534 | A * | 2/1988 | Chenoweth | B65H 75/22 242/578.2 |
| 5,318,239 | A | 6/1994 | Posso | |
| 6,343,765 | B1 * | 2/2002 | Wen | B65H 75/14 242/609.1 |
| 8,074,916 | B2 * | 12/2011 | Penumatcha | B65H 75/14 242/604 |
| 2004/0102870 | A1 | 5/2004 | Andersen et al. | |
| 2004/0206850 | A1 * | 10/2004 | Hafner | B65H 75/14 242/609.4 |
| 2008/0272225 | A1 * | 11/2008 | Hein | A22C 11/125 242/602 |
| 2009/0084887 | A1 * | 4/2009 | Aiston | B65H 75/148 242/587.2 |
| 2009/0314876 | A1 * | 12/2009 | Kessler | B29C 39/028 242/608.6 |
| 2010/0147991 | A1 * | 6/2010 | Huang | B65H 75/22 242/609.1 |

FOREIGN PATENT DOCUMENTS

| | | |
|---|---|---|
| CN | 201447259 U | 5/2010 |
| DE | 3810967 A1 | 10/1989 |
| DE | 42 36 486 A1 | 5/1994 |
| DE | 20118783 U1 | 1/2002 |
| DE | 102005033437 A1 | 2/2007 |
| DE | 202008005926 U1 | 8/2008 |
| DE | 202011107493 U1 | 3/2013 |
| EP | 0433076 A2 | 6/1991 |
| EP | 1987721 B1 | 12/2011 |
| FR | 2777630 B1 | 10/1999 |
| RU | 2 389 675 C2 | 5/2010 |
| RU | 2 413 671 C2 | 3/2011 |

OTHER PUBLICATIONS

Extended European Search Report issued in corresponding European Application No. 15199887.9 dated Jun. 7, 2016 (8 pages).
Office Action issued in corresponding Chinese Application No. 201511036131.6 dated Feb. 4, 2017 (9 pages).
Russian Office Action dated Apr. 13, 2017, issued in corresponding Russian Patent Application No. 2015154954/13 (6 pages).

* cited by examiner

US 10,059,562 B2

CLIP REEL

CROSS-REFERENCE TO RELATED APPLICATION

The present application claims the benefit of priority of German Patent Application No. 202014010142.6 filed Dec. 22, 2014, the contents of which are incorporated herein by reference in their entirety.

FIELD

The present invention relates to a reel for storing and dispensing a winding material wound onto the reel according to the preamble of claim 1.

The invention particularly relates to a reel or spool, respectively, for storing and dispensing a winding material wound onto the reel, particularly a clip line, wherein the reel comprises a hub having a hub axle and side walls disposed on each of the axial end faces of the hub and protruding past the outside circumferential surface of the hub at least approximately in the radial direction. The storage space defined by the surfaces of the side walls facing toward each other and the outside circumferential surface of the hub and surrounding the hub thereby serves for receiving the winding material, wherein the hub is designed having a double wall at least in segments, having a first hub wall and having a second hub wall spaced apart radially from the first hub wall.

BACKGROUND

It is known in practice that, when producing sausage products, for example, the sausage meat is fed by a filling machine via a filling tube of a clipping machine. In the clipping machine, the filling material is filled into a closed tubular-shaped casing material closed on one side by a first clip and the tubular-shaped casing material is closed off by placing a second clip. The closing tools thereby comprise pairs of a punch and a die each, between which the clip is deformed during closing until the minimum spacing of the closing tools is reached. After closing, the closing tools are moved back to the initial or open position thereof. The casing material of the sausage product thus produced is then cut off from the supply of the remaining casing material and the sausage product thus produced is transported out of the clipping machine.

The clips used thereby are provided either as stick clips or S-clips, wherein nearly U-shaped clips are disposed in a bar or stick form having the side surfaces thereof adjacent to each other, or as roll clips or R-clips, wherein U-shaped clips disposed one after the other form a clip line wound onto the reel. It is also known that S-clips are simply connected to each other in the region of the base of the clip so that said clips can be stored on rolls.

Because closure clips are predominantly made of metal, a filled reel and particularly the hub thereof must be able to securely support the high weight of the clip line stored thereon without thereby being damaged during transport or when used on a clipping machine. Such reels are also often intended to be used multiple times, and so must be able to withstand repeated loading, transport, and use.

A roll or reel for storing clips is known from DE utility model 20 2011 107 493 and comprises a hub having side walls disposed on the end faces of the hub. A retaining device is disposed on the reel hub for securing the beginning of the clip line.

A relatively simply constructed reel for storing and dispensing or feeding a clip line is also known from DE laid-open document 10 2005 033 437. The reel has a machine-readable label on one of the side walls thereof for identifying the stored material.

Said known reels exhibit simple construction, particularly a simple hub, but can also have a risk of damage.

EP patent 1 987 721 proposes a clip reel comprising a double-walled hub formed from a single hub wall and semicircular shells placed thereon, wherein a transponder is stored between the hub walls.

FR patent 2 777 630 discloses a winding sleeve that can comprise a relatively large axial length. In order to increase the rigidity of the winding sleeve, half shells are attached about the winding sleeve and supported on the winding sleeve by means of radial bars.

The double-wall design known from the prior art can increase the rigidity of the hub or the winding sleeve and thus reduce the risk of damage. Such a design is complex, however, and thus economically costly to manufacture.

SUMMARY

It is therefore the object of the present invention to provide a reel that overcomes the above disadvantages. It is further the object of the present invention to provide a reel wherein the risk of damage to the reel is reduced and less production effort is required.

The above object is achieved by the features of claim 1. Advantageous embodiments of the reel according to the invention are found in the subordinate claims 2 through 16.

The invention particularly proposes a reel for storing and dispensing a winding material wound onto the reel, particularly a clip line, wherein the reel comprises a hub having a hub axis and side walls disposed on each of the axial end faces of the hub and protruding past the outside circumferential surface of the hub at least approximately in the radial direction, wherein the storage space defined by the surfaces of the side walls facing toward each other and the outer circumferential surface of the hub and surrounding the hub serves for receiving the winding material. The hub of the reel according to the invention exhibits a double-wall design at least in segments, having a first hub wall, and having a second hub wall spaced radially apart from the first hub wall. The invention further proposes that the reel is formed from two reel halves identical in design.

The embodiment of the reel according to the invention as two identical reel halves reduced the production effort, for example by reducing the quantity of injection molds, and thus makes it possible to manufacture the reels at lower cost. In addition, the double-wall hub design at least in segments improves the strength of the reel, and thus reduces the risk of damage.

The reel according to the invention is made of two reel halves, identical with respect to a parting or dividing plane, in which the reel halves can be connected to each other for forming the reel. The dividing plane must therefore simply be placed through the reel so as to produce two identical reel halves. In a preferred embodiment, the dividing plane is perpendicular to the hub axis. Said plane thus runs centered between the side walls of the reel. Alternatively, it can also be provided that the two reel halves can be connected to each other in a dividing plane running through the hub axis for forming the reel. The hub halves, and thus the reel halves, would be nearly semicircular in design in said embodiment.

In order to improve the strength of the hub in particular, it is sufficient if each of the reel halves comprises at least one hub segment extending in the axial direction and having a double-wall design at least in segments. Of course, the entire hub segment of each of the reel halves can also have a double-wall design. It is further possible that the reel has a double-wall design only in segments, that is, that a double-wall segment is followed by a non-double-wall segment as seen in the circumferential direction.

In a further advantageous embodiment of the reel according to the invention, the at least one hub segment of a reel half comprises at least one recess and at least one protrusion corresponding to the recess disposed in the axial direction at the end of the hub segment facing away from the side wall or at the end face of the hub segment. The recess and the protrusion corresponding to the recess can thereby be used as connecting elements for connecting the two reel halves.

It is thereby further advantageous if the recess extends in the direction of the hub segment, as seen from the dividing plane, and the protrusion points away from the hub segment. When connecting the two reel halves, it is possible due to the alignment of the recess and the protrusion that the protrusion of one reel half can engage in the recess of the other reel half.

In order to ensure precise engagement of the recess and the protrusion, it can be further provided that the at least one recess and the at least one protrusion are offset from each other in the circumferential direction by 180° about the at least one hub segment and disposed on the end of the hub segment facing away from the side wall or the end face of the hub segment.

In a preferred embodiment of the reel according to the invention, the recess is disposed in the first hub wall and the protrusion is formed by a segment of the first hub wall. It is thus ensured that a double-wall design of the hub is also achieved in the region of the recesses and protrusions engaging with one another.

Alternatively to disposing the recesses and protrusions on the first hub wall, it is also possible that the recess be disposed in the recess in the second hub wall and that the protrusion is formed by a segment of the second hub wall. The double-wall design of the hub in the region of the recesses and protrusions is also thereby ensured.

In order to improve the connection between the reel halves, it can be further advantageously provided that the at least one hub segment comprises more than one recess and more than one protrusion. Each of the hub segments can thus comprise at least two recesses and protrusions corresponding thereto disposed as symmetrically as possible in order to further improve the connection between the two reel halves.

In principle, it is possible to connect the reel halves releasably or permanently. In the case that the two halves forming a reel can be releasably connected to each other, it is possible to replace a defective reel half with a new one and/or to replace an information carrier present in the region of a double-wall segment, such as a transponder in the form of an RFID label, for example, with a new information carrier in case of a defect. On the other hand, for the case that the two halves forming a reel can be permanently connected to each other, there is no risk that the reel halves of a reel can come apart unintentionally.

In an advantageous embodiment of the reel, latching elements are provided on the at least one hub segment. Said elements can, depending on the specific embodiment, produce both a releasable connection, namely, if they are accessible from the exterior, or a permanent connection, if the latching elements are not accessible in the assembled state. The latching elements can thereby have an arbitrary design, as long as said elements allow secure latching of the reel halves. For example, a latching hook and a latching groove corresponding thereto in which the latching hook engages can be provided, or two latching hooks engaging with each other.

In order to achieve a permanent connection of the reel halves, it is further possible, as an alternative to latching elements or in addition thereto, to use a different means of connection such as a glued or welded connection.

In order to allow positive engagement of the reel with the corresponding mounting element on the machine on which the winding material is to be used, such as a clipping machine, the hub can further comprise at least one torque transfer element on the inner circumferential surface thereof facing toward the hub axis. Of course, a plurality of torque transfer elements can be provided and disposed in a uniform or nonuniform distribution on the inner circumferential surface of the hub facing toward the hub axis.

In a preferred embodiment of the reel according to the invention, a transponder can also be mounted on the inner circumferential surface of the hub. The transponder is thus present between two torque transfer elements and is protected by the torque transfer element having a greater radial extent against contact with or damage from the shaft of the machine onto which the reel according to the invention can be placed for use.

In a particularly preferred embodiment of the reel according to the invention, it is further provided that the double-wall segment of the hub is designed for receiving a transponder. The economic utility of the reel is thereby further increased, and operational reliability is improved, because the transponder in the double-wall segment of the hub is protected against damage.

Various potential devices can be considered as transponders, wherein the transponder is preferably an RFID label from which the data can be read in a non-contacting manner, even when said label is covered, that is, protected against damage.

Further advantageous embodiments and an example of the invention are explained in greater detail below in conjunction with the attached figures. The terms "top", "bottom", "left", and "right" used in the description of the embodiment refer to the figures when oriented so that the reference numerals and figure descriptions can be read normally.

DETAILED DESCRIPTION

The embodiment of the reel according to the invention for storing and dispensing a winding material wound onto the reel is used in a clipping machine, particularly a clipping machine for producing sausages of the type described above.

Figure 1:
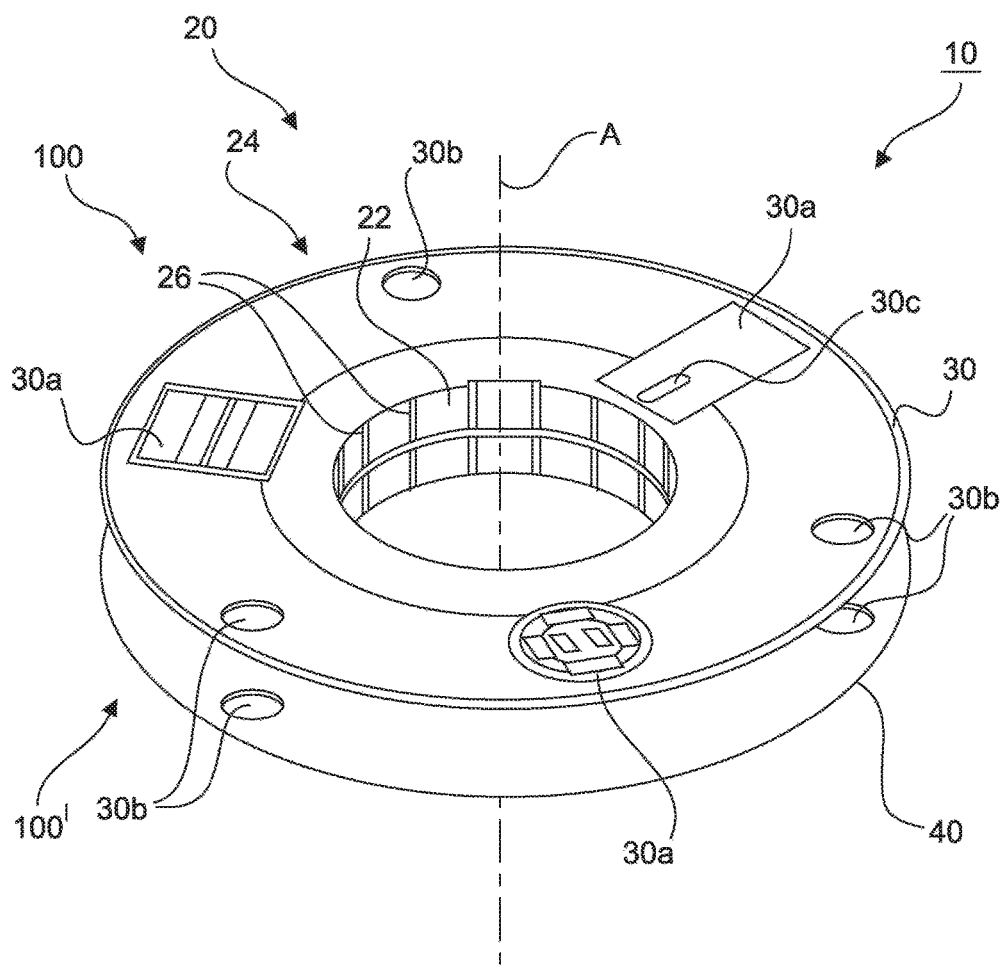
FIG. 1 is a perspective view of an embodiment of the reel according to the invention.

FIG. 1 shows an embodiment example of the reel 10 according to the invention having a hub 20 and side walls 30, 40 disposed on the axial end faces of the hub 20. A hub axis A running coaxially through the hub 20 is oriented at least approximately perpendicular to the side walls 30, 40. The side walls 30, 40 of the reel 10 are formed by circular ring-shaped surface forming the side boundary surfaces of the storage area of the reel 10. The outer circumferential surface of the hub 20 forms the boundary of the storage area of the reel 10 in the direction of the hub axis A.

Figure 2:
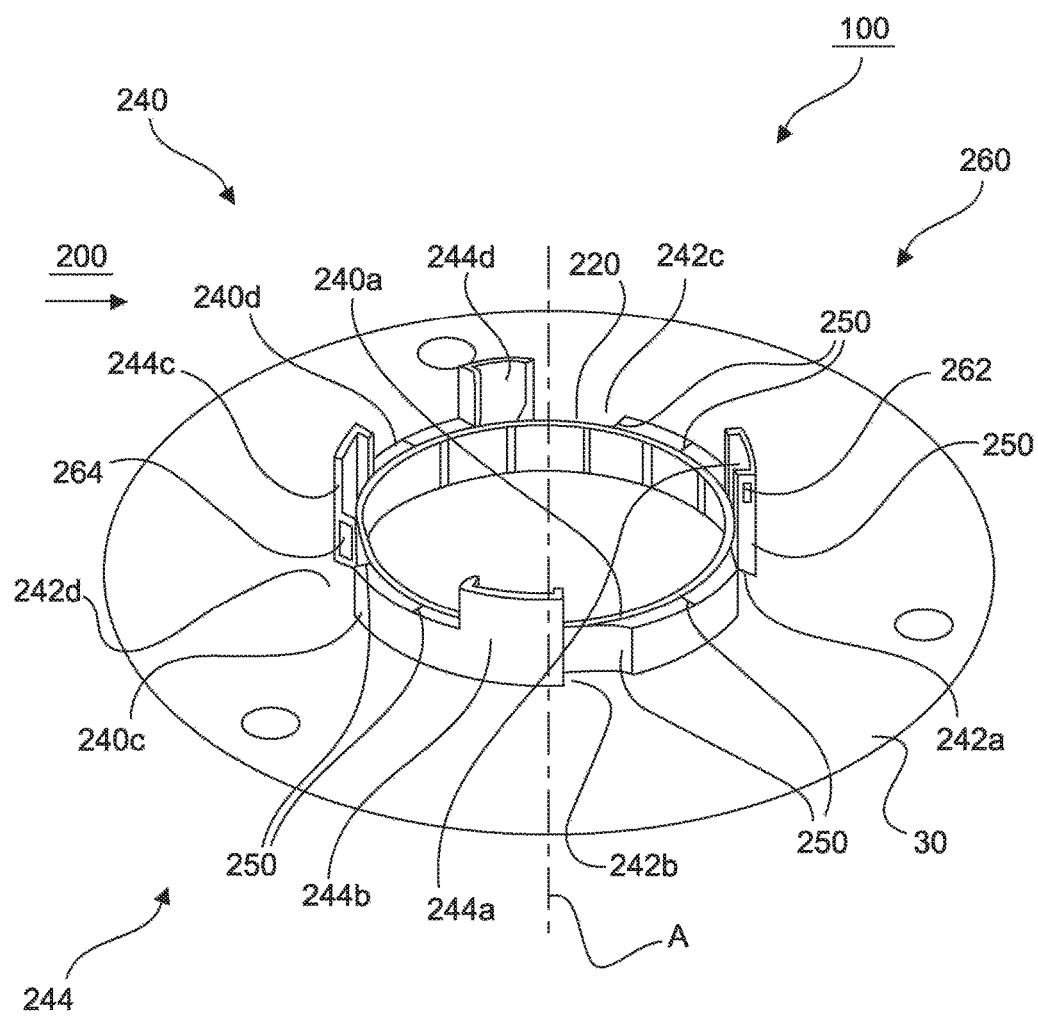
FIG. 2 is a perspective view of a reel half of the reel according to FIG. 1.
Figure 3:
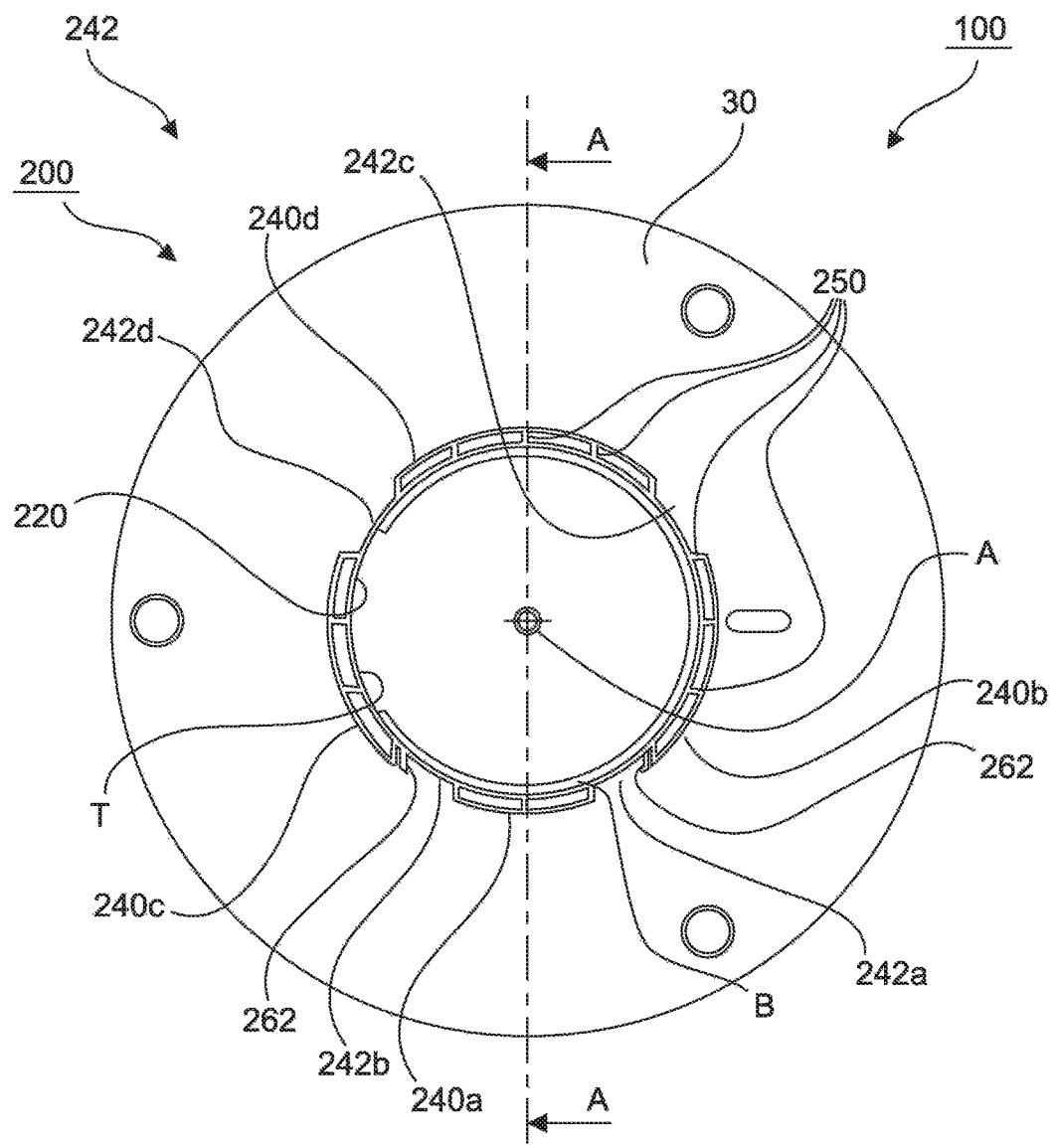
FIG. 3 is a plan view of the reel half according to FIG. 2.
Figure 4:
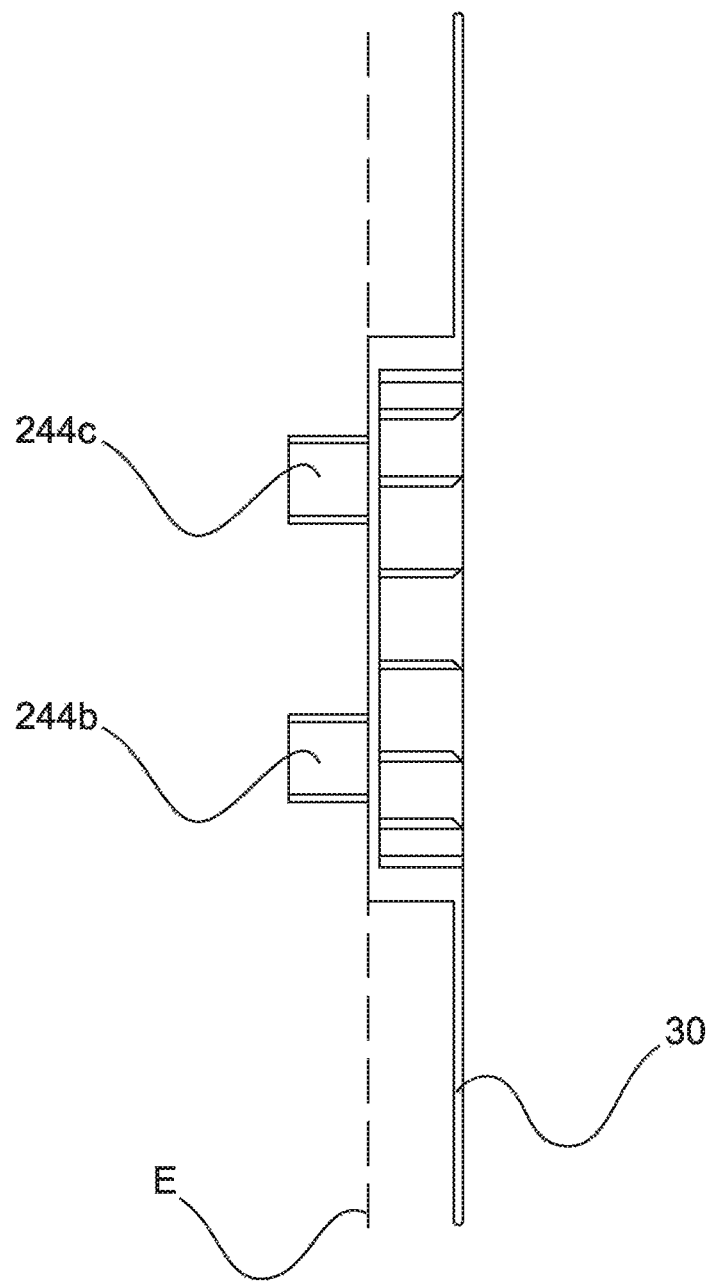
FIG. 4 is a section view of the reel half according to FIGS. 2 and 3 in a perpendicular plane through the hub axis.

As is further explained using FIGS. 2 through 4, the hub 20 of the reel 10 has a double-wall design at least in segments. The hub 20 comprises a first hub wall 22 closer to the hub axis A and a second hub wall 24 further away from the hub axis A and spaced apart radially from the first hub wall 22, of which only the first hub wall 22 is visible in FIG. 1.

Drivers 26 are mounted on the inner circumferential surface of the hub 20 facing toward the hub axis A. Said drivers 26 run in the axial direction, that is, parallel to the hub axis A of the reel 10. Said drivers 26 are distributed at uniform spacing on the hub 20 according to FIG. 1. The drivers 26 provide a positive connection between the reel 10 and a shaft, not shown, of a clipping machine, on which the reel 10 is mounted during operation. The drivers 26 ensure controlled and slip-free rotation of the reel 10 with the shaft, not shown. It is clear that to this end the shaft must comprise recesses corresponding in quantity and shape to the drivers 26. As can be seen in FIG. 1, the drivers 26 are mounted equally spaced apart from each other at least in segments on the inner circumferential surface of the hub 20 facing toward the hub axis A.

As can also be seen in FIG. 1, at least one outer side of the side wall 30 comprises regions 30a distributed uniformly over the circumference. Said three regions 30a in the present embodiment are used for labeling the reel 10 and the winding material stored thereon. Information about the manufacturer, type, size, or use of the winding material can be placed here, for example. The information can be applied during the manufacture of the reel 10, which can be done by means of an injection process. However, a label can also be applied in one of the regions 30a after the assembly and/or filling of the reel 10 is complete. Said label can be a user-readable or machine-readable label, such as a barcode or an RFID label.

The side walls 30, 40 can comprise holes 30b or radially extending elongated holes 30c both for reducing the weight of the reel 10 and for allowing visual inspection of the fill level of the reel 10.

The reel 10 is assembled from two identical reel halves 100, 100' connected at a dividing plane E aligned perpendicular to the hub axis A. Because the reel halves 100, 100' are identical in construction, only the reel half 100 is described below.

FIG. 2 shows a perspective view of the reel half 100 of the reel 10 according to FIG. 1.

The reel half 100 comprises the side wall 30 and a hub segment 200 of the hub 20. The hub segment 200 comprises a first end by means of which said segment is integrally connected to the side wall 30 and a second end face facing away from the side wall 30.

The hub segment 200 comprises a cylindrical part 220 forming one half of the first hub wall 22 (cf. FIG. 1) of the reel 10 facing toward the hub axis A. The cylindrical part 220 has an axial length corresponding at least approximately to half of the axial length of the hub 20 in the assembled state of the reel 10. The first hub wall 22 of the hub 20 is thus formed from the cylindrical part 200 of the first reel half 100 and a corresponding cylindrical part 220' of the second reel half 100' disposed coaxially and adjacent to each other in the assembled state of the reel 10 such that the end faces thereof facing away from the side walls 30, 40 contact each other. The ends of the cylindrical part 220 of the first reel half 100 and of the corresponding cylindrical part 220' of the second reel half 200' facing away from the side walls 30, 40 mark the dividing plane E of the reel 10 (cf. FIG. 4).

The drivers 26, more precisely one half of each driver 26, are disposed on the inner circumferential surface facing toward the hub axis A, that is, the inner side of the cylindrical part 220 of the hub segment 200.

Segments 240 forming one part of the also cylindrical second hub wall 24 (cf. FIG. 1) are disposed on the side of the cylindrical part 220 of the hub segment 200 facing away from the hub axis A.

Said segments or wall segments 240 run concentrically to the cylindrical part 220 and are spaced radially apart therefrom. The wall segments 240 exhibit a height and axial length corresponding to the height and axial length of the cylindrical part 220 and extend from the same side of the side wall 30 as the cylindrical part 220, so that an approximately ring-shaped space is formed at least in segments between the wall segments 240 and the cylindrical part 220. Lands or bars 250 are disposed and aligned at least approximately radially between the wall segments 240, particularly at the end regions, and spaced apart uniformly. The lands 250 extend over the entire radial height of the approximately ring-shaped space between the cylindrical part 220 and the wall segments 240, that is, between the surfaces of the cylindrical part 220 facing toward each other and the segments 240.

According to the embodiment of the reel half 100 according to FIGS. 2 and 3, said reel half comprises four wall segments 240. A first segment 240a can be seen at the bottom right of FIG. 2. Said wall segment 240a is supported by means of three lands 250 on the cylindrical part 220, by one land 250 each at the ends thereof and one further land 250 centered between the ends thereof. Two mirror-symmetrically identical chamber are formed thereby.

A second wall segment 240b and a third wall segment 240c are disposed offset in the circumferential direction from both sides of the first segment 240a, said segments being approximately one-third longer than the first wall segment 240a as seen in the circumferential direction. Each of the second and third wall segments 240b, 240c comprises one land 250 in the end regions thereof and two further lands 250 disposed preferably equally spaced between the ends. The semicircular space between the wall segments 240b, 240c and the cylindrical part 220 is thereby divided into three approximately equally sized chambers.

A fourth wall segment 240d is disposed further in the circumferential direction and offset by approximately 180° from the first wall segment 240a and has approximately double the length of the first wall segment 240a. Said segment is supported against the cylindrical part 220 by means of five lands 250, by one land 250 at each end thereof and three further lands 250 preferably disposed spaced apart uniformly between the ends. Four approximately equal chambers are formed thereby.

Recesses 242 are produced between each of the wall segments 240a, 240b, 240c, and 240d in that the ends of the wall segments 240a, 240b, 240c, and 240d facing toward each other are spaced apart from each other. A first recess 242a and a second recess 242b are thereby formed between the first wall segment 240a and the second wall segment 240b and the third wall segment 240c, and a third recess 242c and a fourth 242d are formed between the fourth wall segment 240d and the second wall segment 240b and the third wall segment 240c. The spacing between each of the wall segments 240a, 240b, 240c, and 240d, and thus the width of the corresponding recess 242, matches the width of the corresponding chambers offset by 180° in the circumferential direction, thus opposite thereof, and the part of the wall segment 240a, 240b, 240c, and 240d forming each chamber. The recesses 242 are thus bounded in the circumferential direction by the lands 250 of the adjacent wall segments 240a, 240b, 240c, and 240d disposed at each of the ends thereof and extend in the axial direction between the side wall 30 and the end of the cylindrical part 220 facing away from the side wall 30 marking the dividing plane E.

Each of the recesses 242 is thus associated with a protrusion 244 offset by 180° in the circumferential direction, thus opposite thereof. Each of the protrusions 244 is formed by an extension of the part of the wall segment 240a, 240b, 240c, and 240d forming the chamber opposite each recess 242. That is, the width of each of the protrusions 244 thus corresponds to the width of the opposite recess 242 offset by 180°, at least in the region of the wall segments 240 forming the second hub wall 24. The height of the protrusions 244, that is, the axial lengths thereof, corresponds to the height and axial length of the recesses 242. In the embodiment example according to FIGS. 2 through 4, this means that because the axial length of the recesses 242 corresponds to the axial length of the cylindrical part 220 of the hub segment 200, the protrusions 244 also have the same axial length as the cylindrical part 220 of the hub 200. The protrusions 244 and recesses 242 can also have any arbitrary height that is less than the height of the cylindrical part 220 of the hub 200. It is essential, however, that the recesses 242 and the protrusions 244 have the same height.

This means that no protrusion 244 is disposed on the first wall segment 242a, but one first and one second protrusion 244a, 244b are disposed on the second and third segments 240b, 240c, here in the region of the end facing toward the first wall segment 240a and the chamber of the first and second wall segments 240b, 240c facing toward the first wall segment 240a, and a third and fourth protrusion 244c, 244d, here at each end of the fourth segment 240d. In other words, the recesses 242a, 242b are opposite the protrusions 244c, 244d of the fourth wall segment 240d, and the recesses 242c, 242d are opposite the protrusions 244a, 244b of the second and third wall segments 240b, 240c.

As is further shown in FIG. 2, the lands 250 immediately adjacent to the protrusions 244a, 244b to the right and left are designed so as to extend over the entire axial length of the first and second wall segment 240a, 240b and the entire axial length of the protrusions 244a, 244b. Said lands 250 thereby form the side boundaries of the protrusions 244a, 244b. On the wall segment 240d, only the second lands 250 as seen from the end of the wall segment 240d are extended past the axial length of the wall segment 244d by the axial length of the protrusions 244c, 244d, thus forming the closure of the side edges of the protrusions 244c, 244d facing toward each other. Said extended lands 250 serve for stabilizing the protrusions 244 such that said protrusions are supported against the cylindrical part 220 of the hub 20 by the lands 250 in the assembled state of the reel 10.

FIG. 2 further shows that latching element pairs 260 are provided in the region of the recesses 242 and protrusions 244, allowing the two reel halves 100, 100' to be connected. Each of the latching element pairs 260 comprises a latch hook 262 and a latch groove 264, wherein the latch hook 262 of one of the two reel halves 100, 100' can engage in the latch groove 264 of the other reel half 100', 100 in the assembled state of the reel 10.

A first latch hook 262 is disposed in the region of the protrusion 244a on the land 250 facing toward the first wall segment 240a. A further latch hook (not visible in FIG. 2) is disposed in the region of the second protrusion 244b, also on the land 250 facing toward the first wall segment 240a. A first latch groove 264 is further disposed on the land 250 of the fourth wall segment 240d facing toward the fourth recess 242d, and a further latch groove (also not visible in FIG. 2) is disposed on the land 250 of the fourth wall segment 240d facing toward the third recess 242c.

The reel halves 100, 100' are, as previously mentioned, completely identical. Said elements, being made of plastic, can be produced in an injection or casting process, wherein only one single mold is required in order to produce both reel halves 100, 100'.

FIG. 3 is a plan view of the reel half 100 from FIG. 2, more precisely a plan view of the dividing plane E of the reel half 100.

The specific design of the hub 20 is made clear in this representation. Here the cylindrical part 220 of the hub segment 200 and the wall segments 240a, 240b, 240c, 240d spaced apart therefrom outward in the radial direction can be seen here, as well as the recesses 242a, 242b, 242c, 242d disposed correspondingly between the wall segments 240a, 240b, 240c, 240d. The latch hooks 262 of the latch element pairs 260 protruding from the surface of the lands 250 facing toward the first wall segment 240a can also be seen.

It can also be seen in FIG. 3 that the lands 250 associated with a wall element 240 are aligned parallel to each other and in the direction of the hub axis A. Only the two lands 250 facing toward the first wall segment 240a from the end of the second and third wall segment 240b, 240c are rotated by approximately 90° relative to the remaining lands 250 of the wall segments 240b, 240c. The result is that the third and fourth recesses 242c, 242d as seen in the circumferential direction comprise boundary surfaces aligned at right angles to each other, as do the first and second protrusions 244a, 244b, whereas the first and second recesses 242a, 242b as seen in the circumferential direction comprise boundary surfaces aligned parallel to each other, as do the third and fourth protrusions 244c, 244d corresponding thereto. Said specific design ensures that the recesses 242 and protrusions 244 opposite each other as seen in the dividing plane E comprise identical cross sections, and thus can engage without a problem with the corresponding protrusions 244' and recesses 242' of the second reel half 100' when the reel 10 is assembled.

A region T can further be seen in FIG. 3, wherein no drivers 26 are disposed on the inner circumferential surface of the cylindrical part of the hub segment 200 facing toward the hub axis A. A rim B also shown in FIG. 3 and extending from the end face of the cylindrical part 220 in the direction of the hub axis A has a radial extent corresponding to the radial extent of the driver 26 (not shown in FIG. 3). The rim B thereby does not extend past the region T.

FIG. 4 is a section view of a reel half 100 according to FIGS. 2 and 3, along the section line AA in FIG. 3, in a plane through the hub axis A. The direction of the view is in the dividing plane E forming the left edge of the hub segment 200 in FIG. 4, that is, the end thereof facing away from the side wall 30.

As can be seen in FIG. 4, the protrusions 244, of which only the third and fourth protrusions 244c, 244d can be seen in FIG. 4, extend from the dividing plane E toward the left, that is, away from the hub segment 200, while the recesses 242 extend from the dividing plane E into the hub segment 200 (see FIG. 2).

For producing a reel 10 according to the invention, at least two reel halves 100, 100' are first produced in the same one or in identical molds, such as by means of an injection process. The two reel halves 100, 100' are then, after cooling, positioned coaxially to each other having the ends of the hub segments 200 facing away from the side walls 30, 40 and rotated 180° about the hub axis A relative to each other. The recesses 242 and protrusions 244 are thereby positioned in the arrangement corresponding to each other. The reel halves 100, 100' are then moved axially toward each other. The protrusions 244 thereby engage in the corresponding recesses 242. When the edges of the protrusions 244 of one of the two reel halves 100, 100' facing away from the hub segment 200 strike against the side wall 30, 40 of the other corresponding reel half 100', 100, the latch hooks 262 of the latching element pairs 260 engage in the corresponding latch grooves 264 and form the connection of the reel halves 100, 100'. The protrusions 244 further form the missing parts of the second hub wall 24, whereby a continuous double-wall design of the hub 20 of the reel 10 is achieved.

In the embodiment example according to FIGS. 2 and 3, the latching elements 262, 264 are disposed so as to be no longer accessible in the assembled state of the reel 10 and thus to form an non-releasable connection, that is, that cannot be released non-destructively.

It can also be provided, of course, that the latching elements 262, 264 of the latching element pair 260 are disposed so as to be accessible and thus releasable in the assembled state of the reel 10.

A non-releasable connection of the reel halves 100, 100' can also, however, be achieve by other means than by latching elements 262, 264, such as by a welding or gluing process.

A transponder such as an RFID label can be applied in the region T free of drivers 26 on the inner circumferential surface of the hub segment 200 facing toward the hub axis A. Because the drivers 26 and the rim B of the reel 10 make contact with the surface of the shaft of the machine on which the reel according to the invention can be placed for use, such as a clipping machine, the transponder does not make contact with said shaft and is thus protected against damage. The transponder is also spaced apart from the winding material stored on the reel by the greatest possible distance, and thus has the greatest possible dielectric distance.

The double-wall design of the hub 20 of the reel 10 according to the invention and the fact that the chambers formed by the double-wall hub 20 are accessible prior to the assembly of the reel 10 allow a transponder to be stored in each of the chambers of the double-wall hub 20 of the reel 10, thus effectively protecting the same against damage or manipulation, as an alternative to applying the transponder on the inner circumferential surface of the hub segment 200 facing toward the hub axis A. If the connection of the reel halves 100, 100' is releasable, it is also possible to replace the transponder in case of a defect.

The reel 10 described by means of the embodiment example comprises four protrusions 244 and four recesses 242 corresponding thereto. In order to design a reel 10 according to the invention, other quantities of recesses 242 and protrusions 244 can be selected, wherein the quantity of the recesses 242 and the quantity of protrusions 244 should match. At least one corresponding recess 242 must, however, be provided for each protrusion 244. Thus one recess 242 and one protrusion 244 each for each reel half 100, 100' are sufficient, wherein the protrusion and recess of one reel half 100, 100' must be offset by 180° in the circumferential direction.

The dividing plane E for forming two identical reel halves 100, 100' is further placed according to the embodiment example of FIGS. 2 and 3 so as to run perpendicular to the hub axis A and parallel between the side walls 30, 40 of the reel 10. Of course the dividing plane E can also run at a different angle to the hub axis A, as long as it is ensured that both resulting reel halves are identical to each other. For example, the dividing plane E can run through the hub axis A. The result is two identical hub halves exhibiting a semicircular design.

What is claimed is:

1. A reel for storing and dispensing a winding material wound on the reel, the reel comprising a hub having a hub axis (A) and side walls each disposed at the axial end faces of the hub and protruding past the outer circumferential surface of the hub in an approximately radial direction, the storage space defined by the surfaces of the side walls facing toward each other and the outer circumferential surface of the hub and surrounding the hub serving for receiving the winding material, and the hub having a double-walled configuration including a first hub wall and a second hub wall spaced radially apart from the first hub wall, wherein the reel is formed of two reel halves identical in design,
   wherein each of the reel halves comprises at least one hub segment of the hub including at least sections that have the double-walled configuration,
   wherein the at least one hub segment comprises at least one recess and at least one protrusion corresponding to the recess disposed on the end of the hub segment facing away from the side wall in the axial direction,
   wherein the recess is disposed in the first hub wall and the protrusion is formed by a segment of the first hub wall, or
   wherein the recess is disposed in the second hub wall and the protrusion is formed by a segment of the second hub wall.

2. The reel according to claim 1,
   characterized in that the two reel halves can be connected to each other in a dividing plane aligned perpendicular to the hub axis for forming the reel.

3. The reel according to claim 1,
   characterized in that the two reel halves can be connected to each other in a dividing plane running through the hub axis for forming the reel.

4. The reel according to claim 1,
   characterized in that the recess extends in the direction of the hub segment as seen from the dividing plane and that the protrusion faces away from the hub segment.

5. The reel according to claim 1,
   characterized in that the at least one recess and the at least one protrusion are disposed offset from each other by 180° in the circumferential direction on the end of the hub segment facing away from the side wall.

6. The reel according to claim 1,
   characterized in that the at least one hub segment comprises more than one recess and more than one protrusion.

7. The reel according to claim 1,
   characterized in that the two halves forming the reel can be releasably connected to each other.

8. The reel according to claim 1,
   characterized in that the two halves forming the reel can be permanently connected to each other.

9. The reel according to claim 1,
   characterized in that latching elements are provided on the at least one hub segment.

10. The reel according to claim 1,
    characterized in that the hub has at least one torque transfer element on the inner circumferential surface thereof facing toward the hub axis.

11. The reel according to claim 1,
characterized in that a transponder can be applied to the inner circumferential surface of the hub facing toward the hub axis.

12. The reel according to claim 11,
characterized in that the transponder is an RFID label.

13. The reel according to claim 11,
characterized in that the winding material is a clip line.

14. The reel according to claim 1,
characterized in that the double-wall segment of the hub is designed for receiving a transponder.

15. The reel according to claim 14,
characterized in that the transponder is an RFID label.

* * * * *